(12) United States Patent  
Ribordy et al.

(10) Patent No.: US 7,519,641 B2  
(45) Date of Patent: Apr. 14, 2009

(54) METHOD AND APPARATUS FOR GENERATING TRUE RANDOM NUMBERS BY WAY OF A QUANTUM OPTICS PROCESS

(75) Inventors: Gregoire Ribordy, Geneva (CH); Olivier Guinnard, Geneva (CH)

(73) Assignee: ID Quantique S.A., Carouge (CH)

( * ) Notice: Subject to any disclaimer, the term of this patent is extended or adjusted under 35 U.S.C. 154(b) by 677 days.

(21) Appl. No.: 10/919,573

(22) Filed: Aug. 17, 2004

(65) Prior Publication Data

US 2005/0071400 A1 Mar. 31, 2005

(51) Int. Cl.
*G06F 1/02* (2006.01)
(52) U.S. Cl. ..................................... 708/255
(58) Field of Classification Search ................ 708/255
See application file for complete search history.

(56) References Cited

U.S. PATENT DOCUMENTS

| | | | | |
|---|---|---|---|---|
| 6,249,009 B1 * | 6/2001 | Kim et al. | ............ | 250/580 |
| 6,393,448 B1 * | 5/2002 | Dultz et al. | ............ | 708/250 |
| 6,539,410 B1 * | 3/2003 | Klass | ............ | 708/255 |
| 6,609,139 B1 * | 8/2003 | Dultz et al. | ............ | 708/250 |
| 6,986,056 B1 * | 1/2006 | Dultz et al. | ............ | 250/200 |

FOREIGN PATENT DOCUMENTS

WO WO 98/16008 4/1998
WO WO 99/66641 12/1999

OTHER PUBLICATIONS

Stefanov et al., Optical quantum random No. generator, Journal of Modern Optics, 2000, p. 595-598, vol. 47, No. 4.
Jennewein et al., A fast and compact quantum random No. generator, Review of Scientific Instruments, 2000, p. 1675-1680, vol. 71, No. 4.
Von Neumann, Various Techniques Used in Connection With Random Digits, Applied Mathematics Series, 1951, p. 36-38, vol. 12.

* cited by examiner

*Primary Examiner*—Tan V Mai
(74) *Attorney, Agent, or Firm*—Moetteli & Associés SàRL

(57) ABSTRACT

A method and apparatus for generating true random numbers by way of a quantum optics process uses a light source to produce a beam which illuminates a detector array. The detectors of the array are associated with random numbers values. Detection of a photon by one of the detectors yields a number whose value is equal to that associated with the detector. This procedure is repeated to produce sequences of true random numbers. The randomness of the numbers stems from the transverse spatial distribution of the detection probability of the photons in the beam. If the array is made up of two detectors, the true random numbers produced are binary numbers. The process can be sped up using an array having pairs of two detectors. Using an array having more than two detectors also allows generating true random numbers of dimension higher than two. The primary object of the invention is to allow generating true random numbers by way of a quantum optics process.

18 Claims, 5 Drawing Sheets

METHOD AND APPARATUS FOR GENERATING TRUE RANDOM NUMBERS BY WAY OF A QUANTUM OPTICS PROCESS

BACKGROUND OF THE INVENTION

This invention relates generally to the field of random number generation, and more particularly to a method and apparatus for generating true random numbers based on a quantum optics process.

Random numbers are essential in many applications and they constitute a very important resource. In cryptography, they are required, for example, in the generation of cryptographic keys or the initialization of certain variables in cryptographic protocols. They also find applications in various others fields such as numerical simulations and statistics.

Great attention must be paid to the way these random numbers are generated. Certain algorithms called pseudo-random number generators exist and produce sequences of numbers that have some of the properties of a sequence of random numbers. However a pseudo-random numbers sequence is not random, in the sense that the knowledge of one number in the sequence allows the prediction of all the other numbers of the sequence, both preceding and following. These algorithms take as input an initialization parameter known as a seed and iteratively produce numbers.

Such pseudo-random number generators are fundamentally inappropriate in cryptography. If one used them to produce a key, the entropy of this key would not be equal to its number of bits, but to the number of bits of the seed used in the generator. In other words, an adversary trying to crack a message protected by encryption with a key produced by such a generator would not have to try all possible keys, but only all possible seeds. The pseudo-random number generator would represent the weakest link in the encryption process chain supposed to protect the message.

In numerical simulations, pseudo-random numbers must also be used with great care. It was shown in the past that small effects revealing possibly interesting physical phenomena in the simulated system can be hidden by structures of the pseudo-random numbers sequence used. Alternatively, artifacts can appear in the results of the simulation.

Finally, when using a pseudo-random number generator, one always has to face the problem of how to choose the seed which must itself be random.

So, in all the cases where pseudo-random number generators are not adequate, one must resort to a physical process as a source of randomness. Hereinbelow, the expression "true random numbers" indicates random numbers generated by a physical process.

True random number generators are devices exploiting a physical process to produce true random numbers. Numerous physical processes can be used as a source of randomness for generating true random numbers. Coin tossing, throwing a dice, thermal noise, shot noise, and avalanche noise are examples of such processes. They are all described by classical physics, which is deterministic. Knowing the state of a system at an initial instant allows the prediction of its evolution at all other times. One must thus rely on the following assumption to use them as a randomness source: all of these processes are produced by a large number of elementary events which give rise globally to a complex and unpredictable behavior that can only be analyzed by probabilistic approaches. In this sense, the randomness of these processes is in appearance only and results from their complexity. True random number generators based on a process described by classical physics are commercially available.

The fact that generators exploiting such processes described by classical physics are difficult to model implies that it is difficult to gain confidence that experimental and environmental condition variations will not affect adversely the quality of the true random numbers output by creating some hidden structures. Similarly, it is difficult to verify that they are operating properly.

Instead of resorting to a physical process described by classical physics, one can also resort to a quantum physical process. Quantum physics is a set of theories describing the microscopic world with never contradicted accuracy. Besides this, randomness is embedded within quantum physics at a fundamental level. Consequently, it makes sense to use a process described by quantum physics as a source of randomness for the generation of true random numbers.

In order to build a true random number generator based on a quantum process, one must select a process, which can be easily used in practice. With current technology, the easiest approach is to work with the elementary quantum systems constituting light and which are called photons. The theory describing light at the quantum level is called quantum optics.

Several approaches based on quantum optics have already been proposed and used to generate true random numbers. Researchers at the University of Geneva, Switzerland, have, for example, developed a generator exploiting the effect of a beamsplitter on a single-photon. This generator is described in an article by A. Stefanov, N. Gisin, O. Guinnard, L. Guinnard, and H. Zbinden, entitled "Optical quantum random number generator", published in the Journal of Modern Optics, 47, 595-598 (2000), the content of which is incorporated herein by reference. The beam is randomly reflected or transmitted. By placing a single-photon detector behind each output port of the beamsplitter and associating a bit value of either "0" or "1" to the detection of the photon by one of the detector, one can produce sequences of random binary bits, whose randomness stems from quantum optics. In practice, producing single-photon states is difficult and impractical. Attenuated light pulses produced for example by a laser were used instead.

Researchers at Deutsche Telekom, Germany, have proposed a similar approach, but have resorted to photon pairs instead of attenuated light pulses. This approach is described in PCT patent numbers WO 98/16008 and WO 99/66641 to W. Dultz and E. Hildebrandt, the contents of which are incorporated herein by reference thereto.

In an article by T. Jennewein, U. Achleitner, G. Weihs, H. Weinfurter, and A. Zeilinger, "A fast and compact quantum random number generator", Review of Scientific Instruments, 71, 1675-1680 (2000), the content of which is incorporated herein by reference thereto, researchers at the University of Innsbruck, Austria, have also proposed an approach based on quantum optics. They sent streams of single-photons arriving at random times on a single-photon detectors. Every time a photon is detected, the voltage of an oscillator is sampled. A binary value "1" is obtained if the voltage is above a certain threshold, a "0" otherwise. The frequency of the oscillator must be significantly higher than the photon detection rate, so that a large number of oscillations take place between each detection event.

These approaches are all based on a quantum optics process that is fundamentally random. However, they each have some disadvantages when it comes to their practical realization.

What is needed therefore is the use of an improved quantum optics process as the basis for the generation of true random numbers. Further, what is needed is a simple and practical true random number generator based on a quantum optics process.

SUMMARY OF THE INVENTION

A method and apparatus for generating true random numbers by way of a quantum optics process uses a light source to produce a beam which illuminates a detector array. The detectors of the array are associated with random numbers values. Detection of a photon by one of the detectors yields a number whose value is equal to that associated with the detector. This procedure is repeated to produce sequences of true random numbers. The randomness of the numbers stems from the transverse spatial distribution of the detection probability of the photons in the beam. If the array comprises two detectors, the true random numbers produced are binary numbers. The process can be sped up using an array having pairs of two detectors. Using an array having more than two detectors also allows generating true random numbers of dimension higher than two.

The primary object of the invention is to allow the generation of true random numbers by way of a quantum optics process.

Another object of the invention is to allow the use of the wave-particle duality as the source of randomness for the generation of true random numbers.

Another object of the invention is to allow the use of the transverse spatial distribution of the photon detection probability in a beam as the source of randomness for the generation of true random numbers.

Another object of the invention is to allow the generation of one true random number either in binary dimensions or higher dimensions upon the detection of one photon.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

Embodiments of the invention will now be described, by way of example only, with reference to the accompanying drawings.

DETAILED DESCRIPTION OF THE PREFERRED EMBODIMENTS

Figure 1:
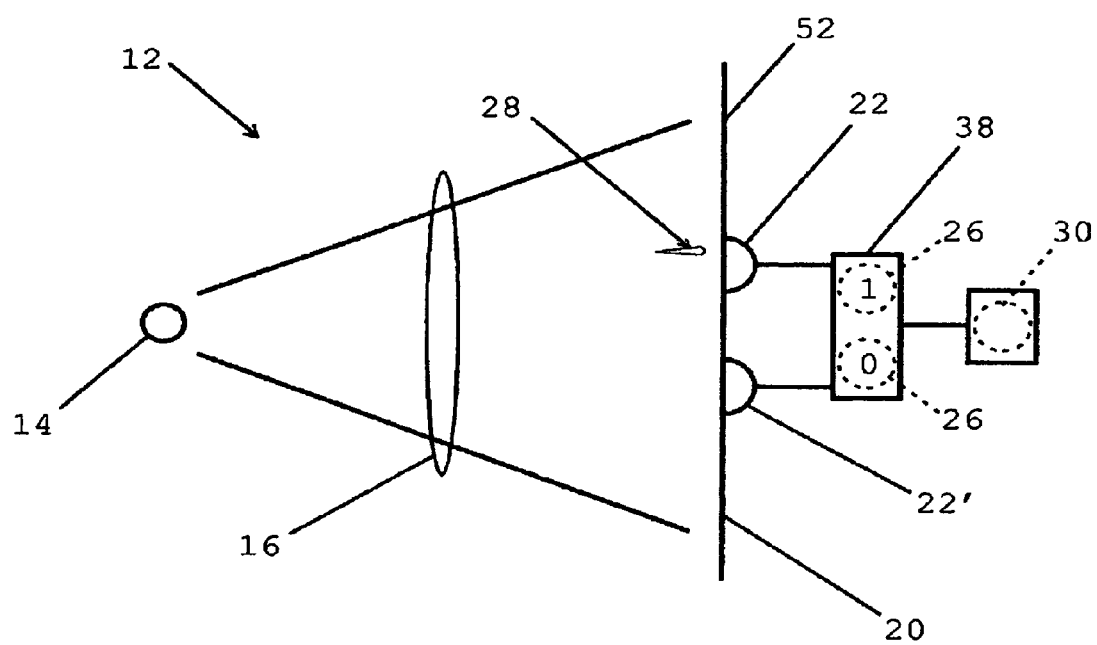
FIG. 1 is a schematic view of the general architecture of the apparatus of the invention.
Figure 2:
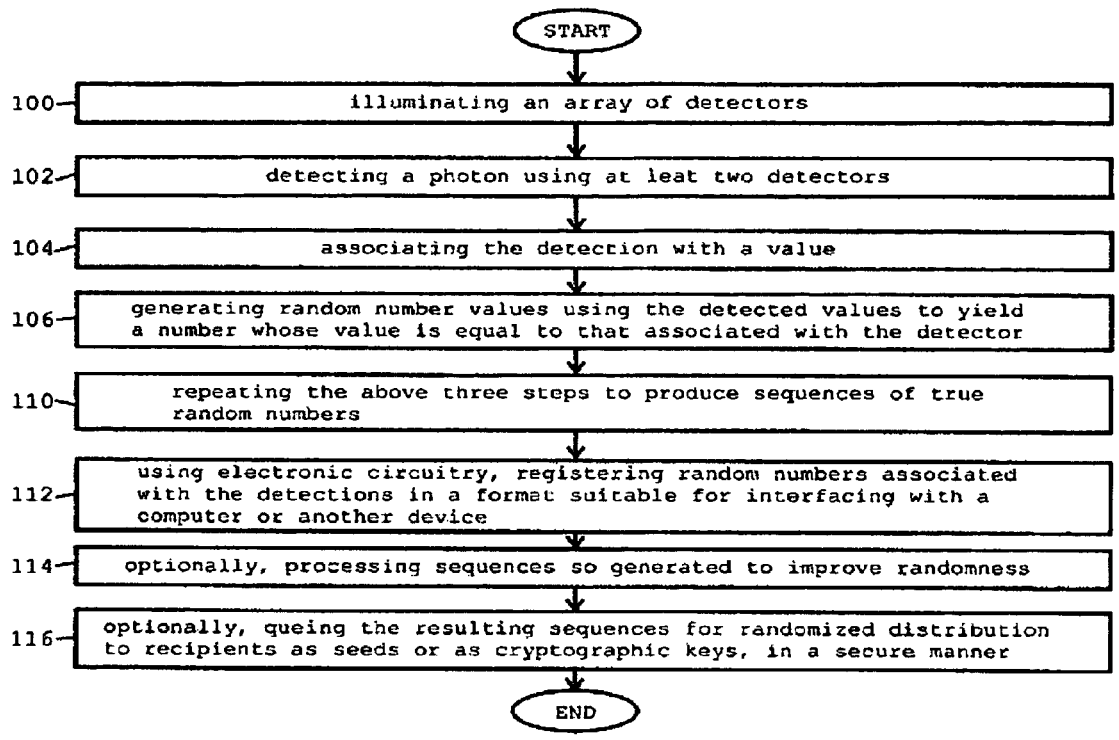
FIG. 2 is a flow chart of the method of the invention.

Referring to FIGS. 1 and 2, a method 10 and apparatus 12 for generating true random numbers 30 by way of a quantum optics process uses a light source 14 to produce a beam 16 which illuminates an array 20 of detectors 22 and 22'. A detector 22 of the array 20 detects or does not detect a photon 28 to yield a random value 26 ("1" or "0", for example) which value is equal to that associated with the detector. The detected values 26 are registered by the electronic circuitry 38. This circuitry puts the true random numbers in suitable format for interfacing with a computer or another device and can arso comprise a buffer. For example, such random values 26 can be summed or processed to yield processed random number values 30.

These steps are repeated to produce sequences, such as a binary number 1001001, which itself represents a true random number 30. The randomness of the numbers 30 stems from the transverse spatial distribution 36 of the detection probability of the photons 28 in the beam 16. If the array 20 comprises two detectors 22 and 22', the true random numbers 30 produced are binary numbers. The process can be sped up using an array 20 having pairs 42 of two detectors 22 and 22'. Using an array 20 having more than two detectors 22 and 22' also allows generating true random numbers 30 of dimension higher than two.

The apparatus 12 is made up of a light source 14 of photons 28, which produces a beam 16 of photons. The light source 14 can for example be a light emitting diode or laser diode. The beam 16 illuminates an array 20 of at least two single-photon detectors 22, 22'. Detectors 22 and 22' can for example be avalanche photodiodes operated in Geiger mode. A value 26 is associated with each detector 22 of this array 20. The detection of a photon 28 in a given detector 22 will yield one random number 30, whose value will be that associated with the detector.

If the detector array 20 is made up of two single-photon detectors 22, 22', the apparatus 12 will produce random binary numbers 30. One detector 22 will be associated with a value of "0" and the other detector 22' with a value of "1".

The randomness of the true random number 30 produced in this way stems from the wave-particle duality of the photons 28. The position of a photon 28 in the beam 16 is described by a wavefunction 36. This function 36 can be used to calculate the spatial detection probability of a photon 28 in the beam 16. If several single-photon detectors 22 are placed on a plane 52 perpendicular to the beam 16, their respective photon detection probability will be related to the value taken by the wavefunction 36 at their location.

Referring now to FIG. 2, the method 10 includes the following steps. In a first step 100, an array 20 of detectors 22 is illuminated. In a second step 102, a photon 28 is detected or not using at least two detectors 22 of the array 20. In a third step 104, the detection is associated with values 26. In a fourth step 106, the detected values 26 generate random numbers values 26 equal to that associated with the detector 22 or 22'. In a fifth step 110, the above three steps are repeated to produce sequences of true random numbers 30. In a sixth step 112, using electronic circuitry 38, random numbers associated with the detections are registered in a format suitable for interfacing with a computer or another device. The device can comprise a buffer.

In an optional seventh step 114, the sequences so generated are processed to remove a possible bias, to produce numbers in a different dimension, or to tailor the probability distribution. In an optional eighth step 116, the sequences of random numbers 30 so generated are qued for randomized distribution to recipients as seeds or as cryptography keys, in a secure manner.

The value associated with each detector 22 or 22' may be determined using a wave function 36 which describes the position of a photon 28 in the beam 16. Then, the spatial detection probability of a photon 28 in the beam 16 is calculated. If several single-photon detectors 22, 22' are placed on a plane 52 perpendicular to the beam 16, their respective photon detection probability is related to a value taken from the wavefunction 36 at their location.

The sequence may optionally subsequently be processed, for example, to remove a possible bias, to produce numbers in a different dimension, or to tailor the probability distribution 36, in a way, for example, as described by J. von Neumann, "Various techniques used in connection with random digits", Applied Mathematics Series, 12, 36-38, U.S. National Bureau of Standards (1951), the content of which is incorporated herein by reference hereto.

In another embodiment of the invention, detection of a photon 28 in detector 22 will produce a true random number 30 of binary value "0", for example, while detection of a photon in detector 22' will produce one of binary value "1".

Figure 3:
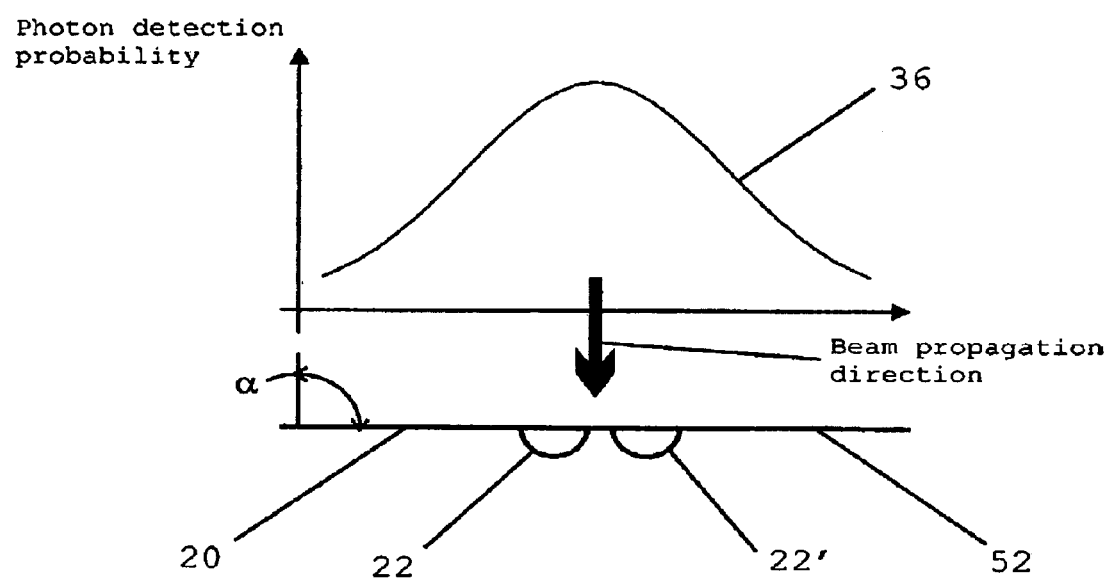
FIG. 3 is a cross-sectional view of the photon detection probability function in the beam and the position of the detector array consisting of two single-photon detectors.

Referring now to FIG. 3, a slice of the spatial distribution 36 of the detection probability of the photons 28 in a beam 16, as well as the position of the single-photon detectors 22 and 22' are shown. Depending on the type of light source 14 used, the shape of this spatial distribution function can be Gaussian. Other shapes are also suitable. If the detectors 22, 22' are suitably located in the beam 16, one sees that the probability of detection of a photon 28 can be identical for each detector 22. A suitable position is, for example, near the center of the beam 16. The randomness of the true random numbers 30 produced in this way stems from the transverse spatial distribution 36 of the photon detection probability in the beam 16.

By repeating these steps, one can produce sequences of true random numbers 30. Further steps process the sequence to, for example, remove a possible bias, combine true random numbers 26 to produce numbers 30 in a different dimension, or tailor the probability distribution, as described by J. von Neumann, "Various techniques used in connection with random digits", supra.

The beam 16 produced by the light source 14 can be made up of light pulses or of a continuous wave. Its intensity is set such that the detection rate of the detector array is far from saturation. The beam 40 can consist of a single mode of the electromagnetic field or several modes.

Figure 4:
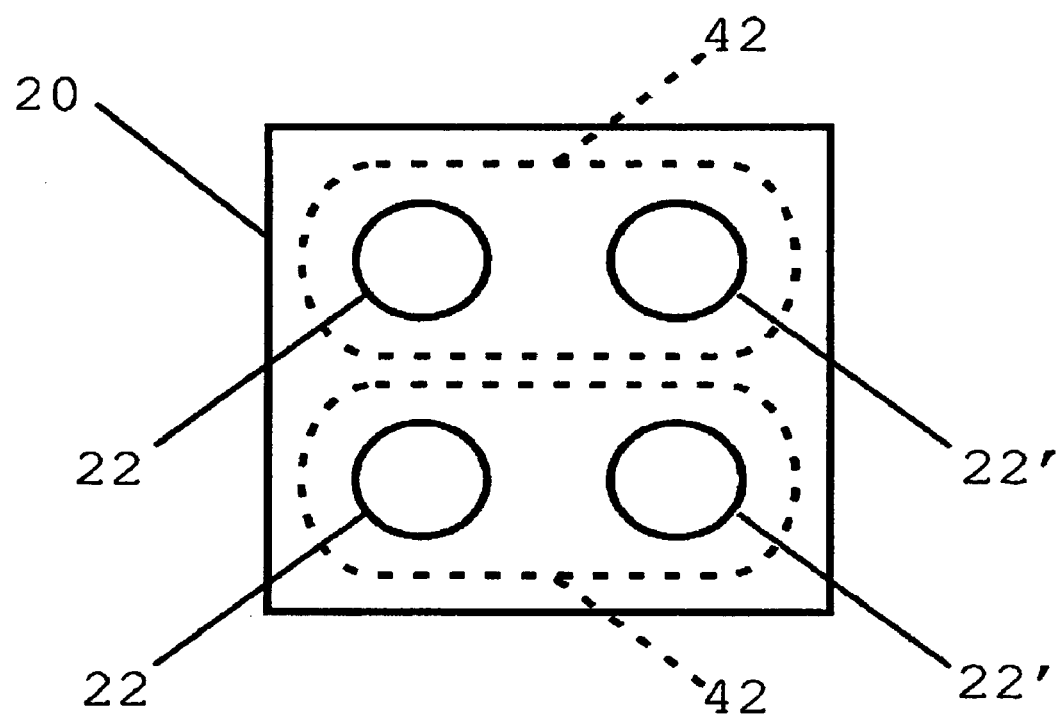
FIG. 4 is a schematic view of a detector array comprising four single-photon detectors.

The apparatus 12 is capable of generating "X-nary" random numbers 30, where X is the number of detectors 22 and 22' used in the array 20 and represents the number of dimensions each random number has. In such a case, the X-nary random number 30 represent X-level bits in an X-dimension system. For example, symbols in a binary system can only have two meanings: traditionally referred to as "on" or "off". Thus, a binary system is an X-nary system in which X=2. For example, when the detector array 20 consists of two single-photon detectors 22 and 22', the true random numbers produced are binary numbers. This detector array 20 can also comprise more than two single-photon detectors. Such a detector array comprising four single-photon detectors—detectors 22 and 22'—is shown in FIG. 4. In this case, the four detectors 22 and 22' can be associated with values from 0 to 3 and produce true random numbers 30 of dimension 4.

In another example, in the decimal system, each digit can have up to ten meanings, i.e., numbers 0 to 9. For the sake of simplicity, we would refer to this system as "ten-nary", an X-nary system in which X=10.

Another possibility is also to group the four detectors 22 and 22' of the array into two pairs of two detectors, each pair producing one binary number.

The detector array can be placed perpendicularly to the beam. The plane of the detector array can also form an angle α different from 90 degrees with the beam propagation direction.

Figure 5:
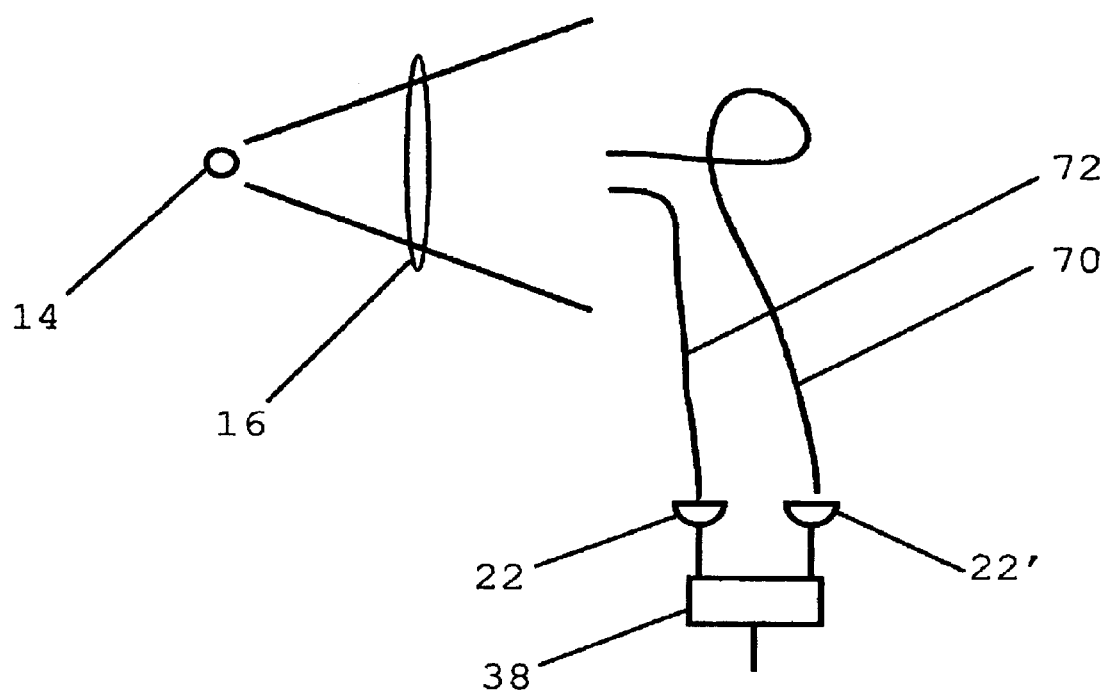
FIG. 5 is a schematic view of the apparatus of the invention, in which the detector array is replaced by an array of waveguides such as optical fibers guiding the photons to remote single-photon detectors.

Referring to FIG. 5, the detector array 20 can be replaced by waveguides such as optical fibers (optical fiber 70 and 72) guiding the light to single-photon detectors.

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. An apparatus for generating true random numbers by way of a quantum optic process, the apparatus comprising:
a light source,
a detector array of single-photon detectors, and
electronic circuitry,
wherein the light source produces a beam of photons which propagate along a beam propagation direction to illuminate the detector array, and wherein a transverse spatial distribution of the detection probability by the detector array of protons is used as a source of randomness so as to generate true random number values which are registered by the electronic circuitry.

2. The apparatus according to claim 1, wherein the light source is a light emitting diode.

3. The apparatus according to claim 1, wherein the light source is a laser diode.

4. The apparatus according to claim 1, wherein the beam comprises a single-mode of the electromagnetic field.

5. The apparatus according to claim 1, wherein the beam comprises several modes of the electromagnetic field.

6. The apparatus according to claim 1, wherein the single-photon detectors in the detector array are avalanche photodiodes.

7. The apparatus according to claim 1, wherein the detector array comprises an array of waveguides guiding the light to single-photon detectors.

8. The apparatus according to claim 1, wherein the detector array comprises two single-photon detectors.

9. The apparatus according to claim 8, wherein detection of a photon by one of the two single-photon detectors is associated with a binary number.

10. The apparatus according to claim 9, wherein sequences of true random binary numbers are produced by consecutive detections of photons by the single-photon detectors of the array.

11. The apparatus according to claim 1, wherein the detector array is positioned substantially perpendicular to the beam.

12. The apparatus according to claim 1, wherein the detector array are positioned within a plane that forms an angle different from 90 degrees with the beam propagation direction.

13. The apparatus according to claim 1, wherein the detector array comprises more than two single-photon detectors.

14. The apparatus according to claim 13, wherein detection of a photon by one of the single-photon detectors of the array is associated with an x-nary number where x equals the number of detectors in the array.

15. The apparatus according to claim 14, wherein sequences of true random numbers are generated by consecutive detections of photons by the single-photon detectors of the array.

16. The apparatus according to claim 13, wherein the detectors in the detector array are grouped in y groups of x detectors, where y is an integer greater or equal to 1 representing the number of groups of detectors and x equals the number of detectors in a group, and wherein detection of a photon by one of the single-photon detectors of one group of detectors of the array is associated with an x-nary number.

17. A method for generating true random numbers by way of a quantum optic process using a light source to produce a beam, comprising the steps of:
  (a) illuminating a detector array of single-photon detectors;
  (b) detecting a photon using at least two detectors of the array, the detection or non-detection being associated with a value, the detected values generating random numbers values, to yield a number whose value is equal to that associated with the detector;
  (c) repeating the above two steps to produce sequences of true random numbers;
  (d) using electronic circuitry, registering random numbers associated with the detections in a format suitable for interfacing with a computer or another device; and
  (e) optionally, processing the sequences so generated to remove a possible bias, to produce numbers in a different dimension, or to tailor the probability distribution,
  wherein the value associated with each detector is determined using a wave function which describes the probability density of the position of a photon in the beam, calculating the spatial detection probability of a photon in a detector, wherein, it several single-photon detectors are placed on a plane perpendicular to the beam, their respective photon detection probability is related to a value taken from the wavefunction at their location, the randomness of the transverse spatial distribution of proton detection probability being a source of randomness.

18. The method of claim 17 wherein the method includes the additional step of queuing the sequences of random numbers so generated for randomized distribution to recipients as seeds or as cryptography keys, in a secure manner.

* * * * *